United States Patent
Yamaguchi et al.

(10) Patent No.: US 12,018,750 B2
(45) Date of Patent: Jun. 25, 2024

(54) WORK VEHICLE

(71) Applicant: KUBOTA CORPORATION, Osaka (JP)

(72) Inventors: Tetsuo Yamaguchi, Sakai (JP); Ryoma Iwase, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/511,508

(22) Filed: Nov. 16, 2023

(65) Prior Publication Data

US 2024/0167566 A1   May 23, 2024

(30) Foreign Application Priority Data

Nov. 17, 2022 (JP) ................. 2022-184324

(51) Int. Cl.
| | |
|---|---|
| *F16H 61/70* | (2006.01) |
| *B60K 17/02* | (2006.01) |
| *B60K 17/10* | (2006.01) |
| *B60K 17/356* | (2006.01) |
| *F16H 47/04* | (2006.01) |
| *F16H 59/44* | (2006.01) |
| *B62D 49/06* | (2006.01) |

(52) U.S. Cl.
CPC .......... *F16H 61/702* (2013.01); *B60K 17/02* (2013.01); *B60K 17/10* (2013.01); *B60K 17/356* (2013.01); *F16H 47/04* (2013.01); *F16H 59/44* (2013.01); *B62D 49/06* (2013.01); *F16H 2200/2035* (2013.01)

(58) Field of Classification Search
CPC ........ F16H 61/702; F16H 61/16; F16H 47/04; F16H 59/44; F16H 59/40; F16H 59/70; F16H 2200/2035; F16H 2059/683; F16H 2059/706; B60K 17/02; B60K 17/10; B60K 17/356; B62D 49/06
See application file for complete search history.

(56) References Cited

U.S. PATENT DOCUMENTS

| | | | | |
|---|---|---|---|---|
| 10,851,522 | B2* | 12/2020 | Kamiya ................. | E02F 9/2292 |
| 2003/0226416 | A1* | 12/2003 | Umemoto ......... | B60W 30/1819 74/335 |
| 2011/0048829 | A1* | 3/2011 | Matsumoto ........... | E02F 9/2079 180/197 |
| 2012/0296531 | A1* | 11/2012 | Hyodo .................... | E02F 9/264 701/50 |
| 2014/0345890 | A1* | 11/2014 | Nagamura ................ | E02F 3/84 172/3 |
| 2015/0120158 | A1* | 4/2015 | Vande Haar ........ | F16H 61/0213 701/65 |

(Continued)

FOREIGN PATENT DOCUMENTS

JP   2019-095058 A   6/2019

*Primary Examiner* — Jacob S. Scott
*Assistant Examiner* — Farhana Pervin
(74) *Attorney, Agent, or Firm* — Keating & Bennett, LLP

(57) ABSTRACT

A work vehicle includes a restrainer vehicle speed setter to set a restrainer vehicle speed, and a switch restrainer to permit switching of the forward/backward travel switching device while a detected vehicle speed is lower than the restrainer vehicle speed and prevent switching of the forward/backward travel switching device while the detected vehicle speed is a high speed not lower than the restrainer vehicle speed.

10 Claims, 8 Drawing Sheets

(56) References Cited

U.S. PATENT DOCUMENTS

| | | | |
|---|---|---|---|
| 2015/0176705 A1* | 6/2015 | Dix | F16H 61/431 |
| | | | 701/50 |
| 2020/0132169 A1* | 4/2020 | Iwaki | F16H 3/44 |
| 2020/0166087 A1* | 5/2020 | Ono | F16H 61/0021 |
| 2020/0404834 A1* | 12/2020 | Zerbino | B60K 35/00 |
| 2021/0332875 A1 | 10/2021 | Tsuchida et al. | |
| 2022/0112950 A1* | 4/2022 | Azuma | F16H 59/48 |
| 2023/0220910 A1* | 7/2023 | Owada | F16H 47/04 |
| 2023/0383828 A1* | 11/2023 | Iwaki | B60K 17/10 |

* cited by examiner

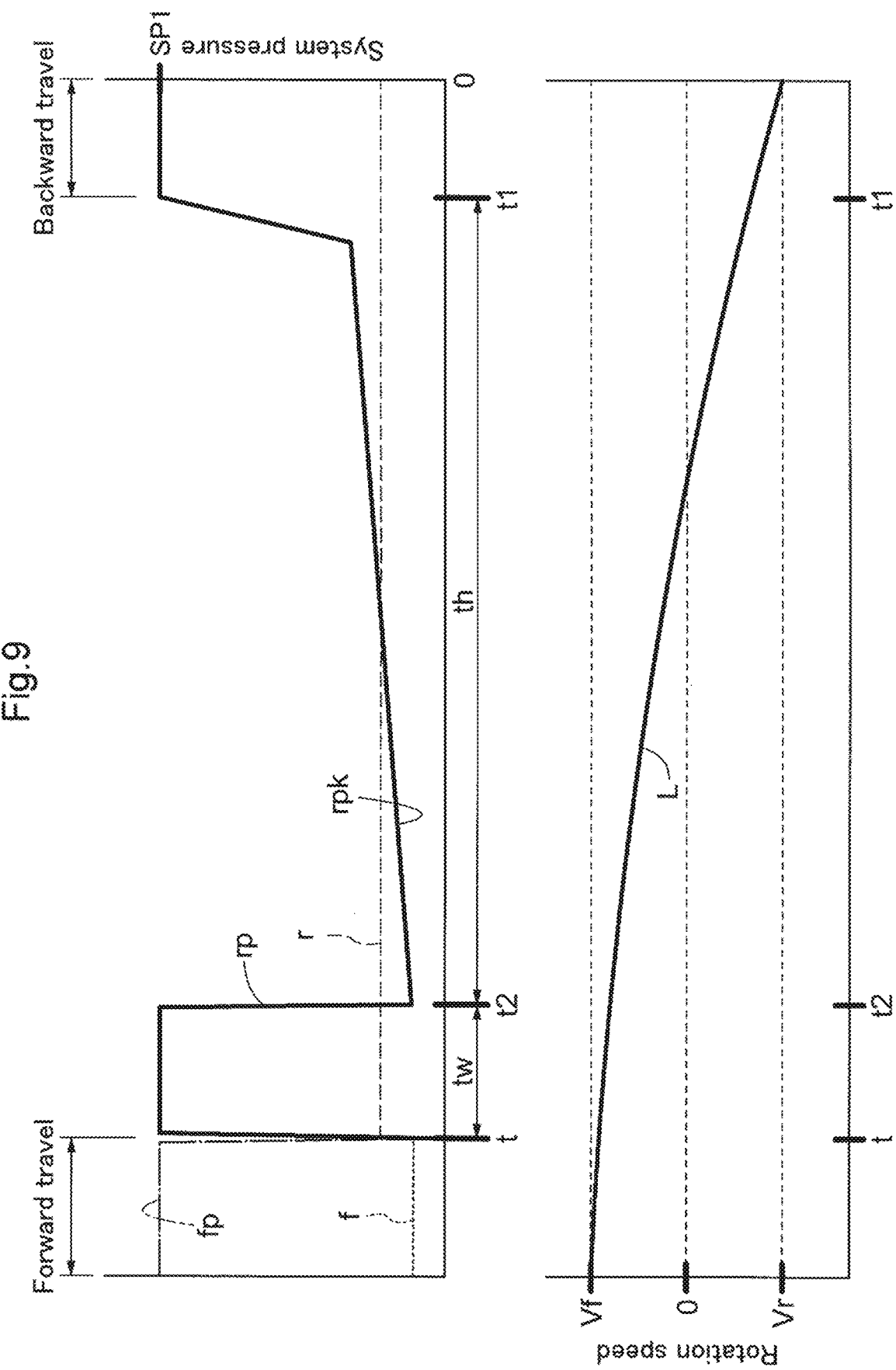

WORK VEHICLE

CROSS REFERENCE TO RELATED APPLICATIONS

This application claims the benefit of priority to Japanese Patent Application No. 2022-184324 filed on Nov. 17, 2022. The entire contents of this application are hereby incorporated herein by reference.

BACKGROUND OF THE INVENTION

1. Field of Invention

The present invention relates to a work vehicle.

2. Description of the Related Art

JP 2019-95058 A discloses a work vehicle (tractor) including a continuously variable transmission, a planetary transmission, a forward/backward travel switching device, a speed change operation tool, and a forward/backward travel switching tool. The continuously variable transmission is of a hydrostatic type, and is configured to receive motive power from the engine, vary the motive power, and output the varied motive power. The planetary transmission is configured to receive motive power from the engine and motive power from the continuously variable transmission, composite the motive power from the engine and the motive power from the continuously variable transmission, and output the composite motive power. The planetary transmission is also configured to vary the composite motive power in response to the continuously variable transmission being varied. The forward/backward travel switching device is switchable between a forward-travel power transmission state and a backward-travel power transmission state. In the forward-travel power transmission state, the forward/backward travel switching device switches the composite motive power from the planetary transmission into forward-travel motive power and outputs the forward-travel motive power to a movable body (front wheels, rear wheels). In the backward-travel power transmission state, the forward/backward travel switching device switches the composite motive power from the planetary transmission into backward-travel motive power and outputs the backward-travel motive power to the movable body. The speed change operation tool (shift lever) is for use to vary the continuously variable transmission. The forward/backward travel switching tool (forward/backward travel lever) is for use to switch the forward/backward travel switching device.

The above-described work vehicle is configured such that varying the continuously variable transmission with use of the speed change operation tool changes the speed of composite motive power from the planetary transmission to change the drive rate of the movable body and that switching the forward/backward travel switching device with use of the forward/backward travel switching tool switches how the movable body is driven between the forward-travel side and the backward-travel side. In other words, varying the continuously variable transmission with use of the speed change operation tool changes the travel speed for forward travel and backward travel, and switching the forward/backward travel switching device with use of the forward/backward travel switching tool switches between forward travel and backward travel.

Work vehicles of this type cause a shock when the forward/backward travel switching device is switched between the forward-travel power transmission state and the backward-travel power transmission state. Preventing such a shock requires the forward/backward travel switching device to be switchable only while the vehicle speed is low. With the forward/backward travel switching device switchable only while the vehicle speed is low, the work vehicle needs to decelerate by a large amount for the forward/backward travel switching device to be switchable when the work vehicle switches between forward travel and backward travel while the work vehicle performs work in which the body frequently switches between forward travel and backward travel such as dozer work. This leads to a longer time period to switch between forward travel and backward travel.

SUMMARY OF THE INVENTION

Preferred embodiments of the present invention provide work vehicles each capable of switching between forward travel and backward travel with a reduced shock and rapidly as a result of a reduced amount of deceleration to permit switching.

A work vehicle according to a preferred embodiment of the present invention includes an engine, a movable body, a hydrostatic, continuously variable transmission to receive motive power from the engine, vary the motive power, and output the varied motive power, a planetary transmission to receive the motive power from the engine and the motive power from the continuously variable transmission, composite the motive power from the engine and the motive power from the continuously variable transmission, and vary and output the composite motive power in response to the continuously variable transmission being varied, a forward and backward travel switching device switchable between a forward-travel power transmission state and a backward-travel power transmission state, such that, in the forward-travel power transmission state, the forward and backward travel switching device switches the composite motive power from the planetary transmission into forward-travel motive power and outputs the forward-travel motive power to move the movable body, and in the backward-travel power transmission state, the forward and backward travel switching device switches the composite motive power from the planetary transmission into backward-travel motive power and outputs the backward-travel motive power to move the movable body, a speed change operation tool usable to vary the continuously variable transmission, a forward and backward travel switching tool for use to switch the forward and backward travel switching device, a vehicle speed detector to detect a vehicle speed of the work vehicle, and a controller configured or programmed to define or function as a restrainer vehicle speed setter to set a restrainer vehicle speed to prevent switching of the forward and backward travel switching device, and a switch restrainer to (i) permit switching of the forward and backward travel switching device while the vehicle speed detected by the vehicle speed detector is lower than the restrainer vehicle speed and (ii) prevent switching of the forward and backward travel switching device while the vehicle speed detected by the vehicle speed detector is not lower than the restrainer vehicle speed, wherein the restrainer vehicle speed setter is configured or programmed to change the restrainer vehicle speed.

The above configuration allows the restrainer vehicle speed to be changed to the low-speed side or high-speed side. Changing the restrainer vehicle speed to the low-speed side allows the forward and backward travel switching device to be switched in response to the forward and backward travel switching tool being operated while the work vehicle is traveling at low speeds as compared to the case of changing the restrainer vehicle speed to the high-speed side. This allows the work vehicle to switch between forward travel and backward travel with a reduced shock. Changing the restrainer vehicle speed to the high-speed side allows the forward and backward travel switching device to be switched in response to the forward and backward travel switching tool being operated while the work vehicle is traveling at high speeds as compared to the case of changing the restrainer vehicle speed to the low-speed side. This allows the work vehicle to decelerate only by a small amount for the forward and backward travel switching device to be switchable, and allows the work vehicle to switch between forward travel and backward travel rapidly.

The controller may preferably be configured or programmed to define or function as a deceleration controller to, in response to the forward and backward travel switching tool being operated, vary the continuously variable transmission for deceleration if the vehicle speed detected by the vehicle speed detector is not lower than the restrainer vehicle speed so that the vehicle speed detected by the vehicle speed detector is lower than the restrainer vehicle speed.

With the above configuration, operating the forward and backward travel switching tool causes the deceleration controller to decelerate the work vehicle to a vehicle speed at which the forward and backward travel switching device is switchable. The above configuration thus eliminates the particular trouble to decelerate the work vehicle, and allows the work vehicle to switch between forward travel and backward travel easily.

The work vehicle may preferably be further configured such that the forward and backward travel switching device includes a forward clutch engageable to switch the forward and backward travel switching device into the forward-travel power transmission state, and a reverse clutch engageable to switch the forward and backward travel switching device into the backward-travel power transmission state, and the work vehicle further includes a speed adjustment mechanism to adjust a speed with which the forward clutch and the reverse clutch are each switched.

With the above configuration, the speed adjustment mechanism allows the forward and reverse clutches to be switched slowly or quickly. Sending the restrainer vehicle speed on the high-speed side causes the forward and backward travel switching device to be switched while the vehicle speed is high, the forward and reverse clutches are switched slowly for a reduced shock. While setting the restrainer vehicle speed on the low-speed side causes the forward and backward travel switching device to be switched while the vehicle speed is low, the forward and reverse clutches are switched quickly for rapid switching between forward travel and backward travel.

The work vehicle may preferably be further configured such that the forward and backward travel switching device includes a forward clutch engageable to switch the forward and backward travel switching device into the forward-travel power transmission state, and a reverse clutch engageable to switch the forward and backward travel switching device into the backward-travel power transmission state, and the work vehicle further includes a clutch pressure adjustment mechanism to adjust a pressure at which the forward clutch and the reverse clutch are each engaged.

With the above configuration, the clutch pressure adjustment mechanism adjusts the pressure so that the forward and reverse clutches each become engaged at low pressures for the body to change its direction quickly or at high pressures for the body to change its direction even while the vehicle speed is high.

The work vehicle may preferably be further configured such that the restrainer vehicle speed setter is configured or programmed to change the restrainer vehicle speed continuously over a predetermined range.

The work vehicle may preferably be further configured such that the forward and backward travel switching device includes a forward clutch engageable to switch the forward and backward travel switching device into the forward-travel power transmission state, and a reverse clutch engageable to switch the forward and backward travel switching device into the backward-travel power transmission state, and the work vehicle further includes a speed adjustment mechanism to adjust a speed with which the forward clutch and the reverse clutch are each switched, a clutch pressure adjustment mechanism to adjust a pressure at which the forward clutch and the reverse clutch are each engaged, and a clutch controller configured or programmed to determine based on an input from the restrainer vehicle speed setter whether the restrainer vehicle speed is on a low-speed side or a high-speed side, and the clutch controller is configured or programmed to in response to determining that the restrainer vehicle speed is on the low-speed side, adjust the speed adjustment mechanism to a high-speed side and the clutch pressure adjustment mechanism to a low-pressure side, and in response to determining that the restrainer vehicle speed is on the high-speed side, adjust the speed adjustment mechanism to a low-speed side and the clutch pressure adjustment mechanism to a high-pressure side.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 provides a graph that shows how clutches are switched in response to a forward/backward travel switching device being switched from a forward-travel state to a backward-travel state a graph that shows the results of measuring a change in the vehicle speed.

DETAILED DESCRIPTION OF THE PREFERRED EMBODIMENTS

The description below describes preferred embodiments of the present invention with reference to drawings.

Figure 1:
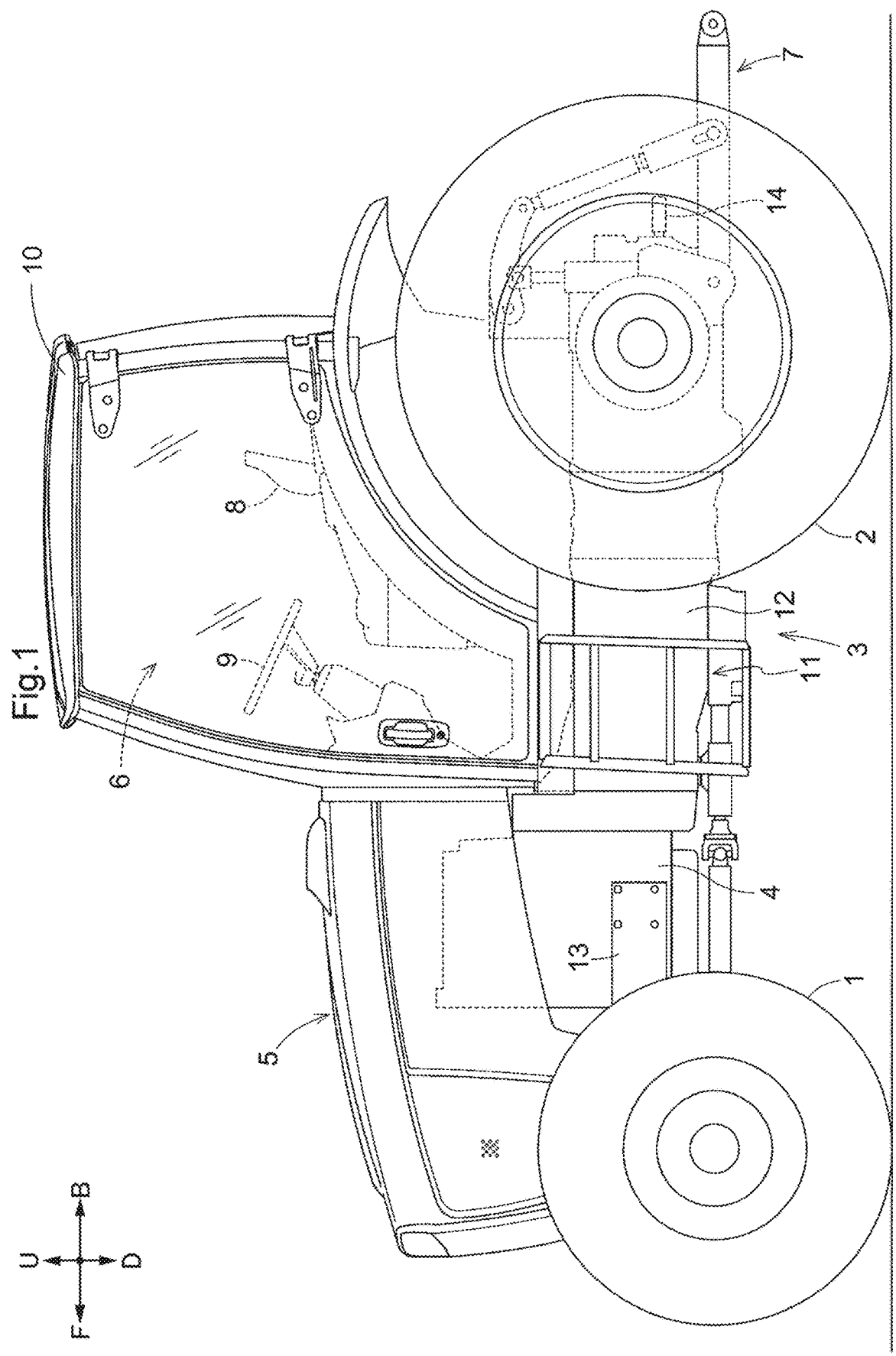
FIG. 1 is a side view of a tractor.

The preferred embodiments described below relate to a tractor (which is an example of the "work vehicle") including a body. FIG. 1 shows arrow F to indicate the forward side of the body, arrow B to indicate the backward side of the body, arrow U to indicate the upward side of the body, and arrow D to indicate the downward side of the body. The front side of FIG. 1 corresponds to the left side of the body, whereas the back side of FIG. 1 corresponds to the right side of the body.

FIG. 1 illustrates a tractor including a pair of left and right turnable and drivable front wheels 1 ("movable body"), a pair of left and right drivable rear wheels 2 ("movable body"), and a body 3 supported by the front and rear wheels 1 and 2. The tractor includes a motive section 5 including an engine 4 at a front portion of the body 3. The tractor includes a driver section 6 and a link mechanism 7 at a back portion of the body 3. The driver section 6 is configured to accommodate an operator to drive the tractor. The link mechanism 7 is configured to couple an implement such as a rotary tiller device to the tractor in such a manner that the implement is capable of being lifted and lowered. The driver section 6 includes a driver's seat 8, a steering wheel 9 for use to turn the front wheels 1, and a cabin 10 defining a driver space. The body 3 includes a body frame 11 including an engine 4, a transmission case 12, and front-wheel support frame members 13. The transmission case 12 includes a front portion coupled to a back portion of the engine 4. The front-wheel support frame members 13 are coupled to a lower portion of the engine 4. The tractor includes a power takeoff shaft 14 at a back portion of the transmission case 12. The power takeoff shaft 14 is configured to take off motive power from the engine 4 and transmits the motive power to the implement coupled with use of the link mechanism 7.

Figure 2:
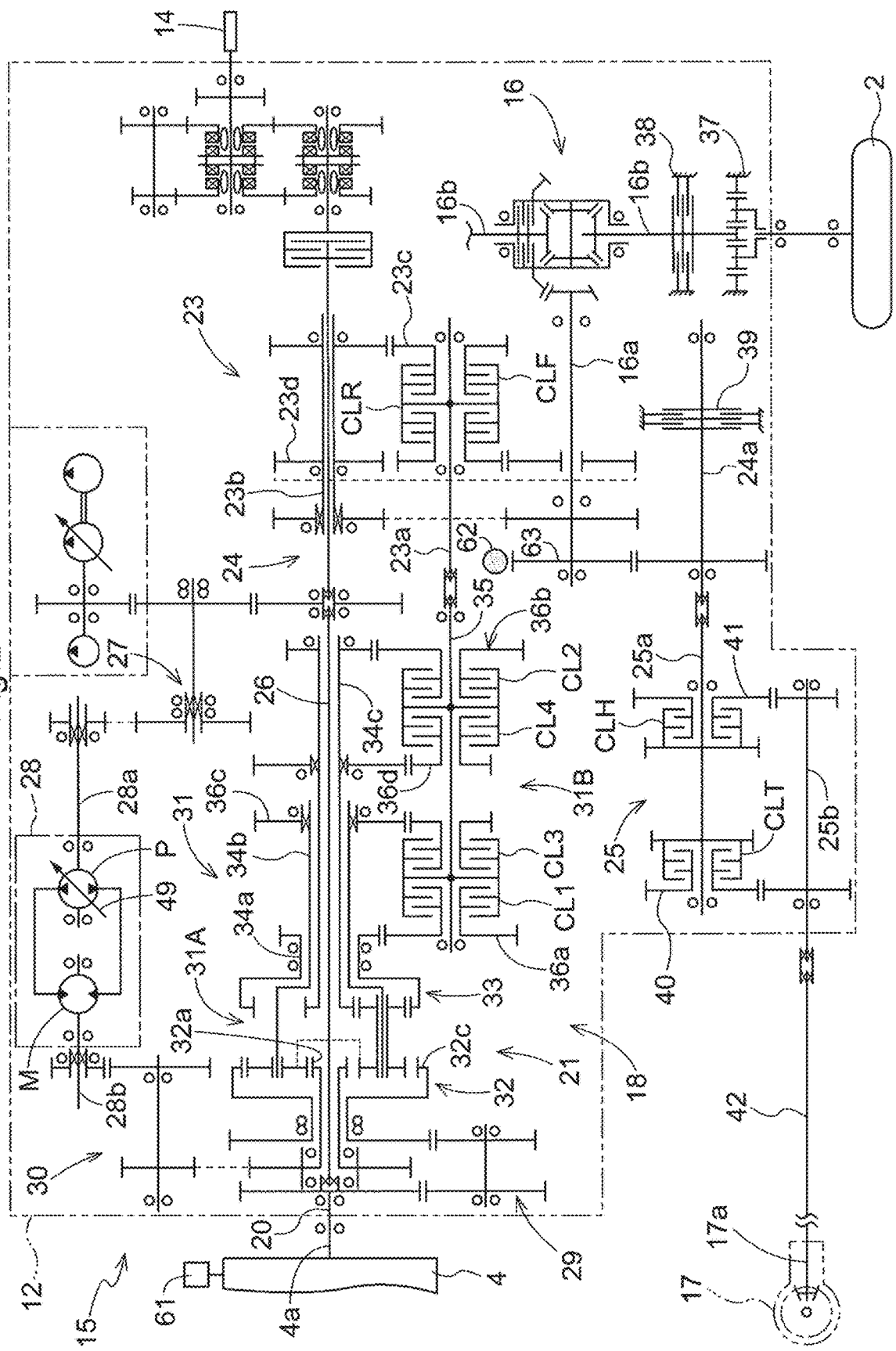
FIG. 2 is a diagram schematically illustrating a power transmission.

FIG. 2 illustrates a power transmission 15 for travel configured to transmit motive power from the engine 4 to the front and rear wheels 1 and 2. The power transmission 15 includes a transmission 18 contained in the transmission case 12 and configured to vary motive power from the engine 4 and transmit the varied motive power to the rear-wheel differential mechanism 16 and the front-wheel differential mechanism 17.

As illustrated in FIG. 2, the transmission 18 includes an input shaft 20, a main transmission section 21, a forward/backward travel switching device 23, a gear mechanism 24, and a front-wheel power transmission section 25. The input shaft 20 is disposed at a front portion of the transmission case 12 and configured to receive motive power from the output shaft 4a of the engine 4. The main transmission section 21 is configured to receive motive power from the input shaft 20, vary the motive power, and output the varied motive power. The forward/backward travel switching device 23 is configured to receive the output of the main transmission section 21. The gear mechanism 24 is configured to transmit the output from the forward/backward travel switching device 23 to the input shaft 16a of the rear-wheel differential mechanism 16. The front-wheel power transmission section 25 is configured to receive motive power outputted from the forward/backward travel switching device 23, vary the motive power, and output the varied motive power to the front-wheel differential mechanism 17.

As illustrated in FIG. 2, the main transmission section 21 includes a continuously variable transmission 28 and a planetary transmission 31. The continuously variable transmission 28 is configured to receive motive power from the input shaft 20. The planetary transmission 31 is configured to receive motive power from the input shaft 20 and the output from the continuously variable transmission 28.

The continuously variable transmission 28, as illustrated in FIG. 2, includes a hydraulic pump P and a hydraulic motor M. The hydraulic pump P has a variable capacity and includes a pump shaft 28a coupled to the input shaft 20 through a rotary shaft 26 and a first gear mechanism 27. The rotary shaft 26 includes a front end portion coupled to the input shaft 20. The first gear mechanism 27 is coupled to a back end portion of the rotary shaft 26. The hydraulic motor M is drivable via pressurized oil from the hydraulic pump P. The hydraulic pump P includes a swash plate with an angle changeable to vary motive power from the input shaft 20 into normal-direction motive power or reverse-direction motive power, and is configured to continuously vary the rotation speed of the normal-direction motive power or reverse-direction motive power and output the resulting motive power from a motor shaft 28b. The continuously variable transmission 28 is of a hydrostatic type.

Figure 3:
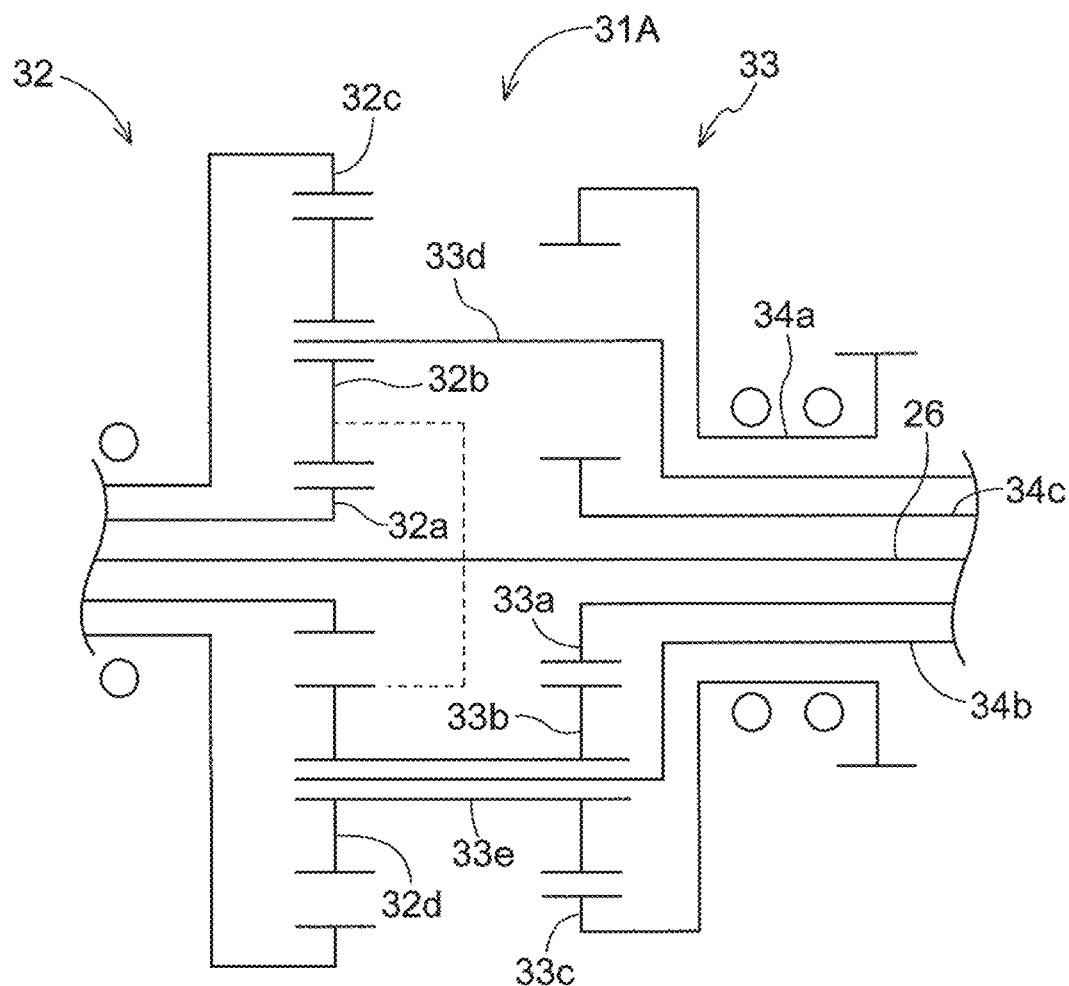
FIG. 3 is a diagram schematically illustrating a planetary transmission section.

The planetary transmission 31, as illustrated in FIG. 2, includes a planetary transmission unit 31A and an output section 31B. The planetary transmission unit 31A is configured to receive motive power from the input shaft 20 and the output from the continuously variable transmission 28. The output section 31B is configured to receive motive power from the planetary transmission unit 31A and output the motive power in one of four speed ranges, for example. As illustrated in FIGS. 2 and 3, the planetary transmission unit 31A includes a first planetary transmission section 32 including (i) a first sun gear 32a, (ii) a first planetary gear 32b meshing with the first sun gear 32a, and (iii) a first ring gear 32c including inner teeth meshing with the first planetary gear 32b. The planetary transmission unit 31A also includes a second planetary transmission section 33 backward of the first planetary transmission section 32 and including (i) a second sun gear 33a, (ii) a second planetary gear 33b meshing with the second sun gear 33a, (iii) a second ring gear 33c including inner teeth meshing with the second planetary gear 33b, and (iv) a second carrier 33d holding the second planetary gear 33b.

As illustrated in FIG. 2, the main transmission section 21 includes a second gear mechanism 30 extending from the first sun gear 32a to the motor shaft 28b of the continuously variable transmission 28 and configured to transmit the output from the continuously variable transmission 28 to the first sun gear 32a. The main transmission section 21 includes a third gear mechanism 29 extending from the first ring gear 32c to the input shaft 20 and configured to transmit motive power from the input shaft 20 to the first ring gear 32c. As illustrated in FIGS. 2 and 3, the first planetary transmission section 32 includes an interlocking gear 32d meshing with the first planetary gear 32b and coupled in an interlocked manner to the second planetary gear 33b with use of a coupler 33e. The first and second planetary transmission sections 32 and 33 define a so-called compound planetary transmission section.

As illustrated in FIGS. 2 and 3, the output section 31B includes a first input shaft 34a, a second input shaft 34b, and a third input shaft 34c in a triple-shaft structure as well as an output shaft 35 parallel to, for example, the first input shaft 34a. The first input shaft 34a is coupled to the second ring gear 33c. The second input shaft 34b is coupled to the second carrier 33d. The third input shaft 34c is coupled to the second sun gear 33a. The first input shaft 34a is coupled to a first range gear mechanism 36a. The main transmission section 21 includes a first clutch CL1 extending from the first range gear mechanism 36a to the output shaft 35. The third input shaft 34c is coupled to a second range gear mechanism 36b. The main transmission section 21 includes a second clutch CL2 extending from the second range gear mechanism 36b to the output shaft 35. The second input shaft 34b is coupled to a third range gear mechanism 36c. The main transmission section 21 includes a third clutch CL3 extending from the third range gear mechanism 36c to the output shaft 35. The third input shaft 34c is coupled to a fourth range gear mechanism 36d. The main transmission section 21 includes a fourth clutch CL4 extending from the fourth range gear mechanism 36d to the output shaft 35.

The main transmission section 21 is configured such that the engine 4 transmits motive power through the input shaft 20, the rotary shaft 26, and the first gear mechanism 27 to the hydraulic pump P. The continuously variable transmission 28 varies the motive power into normal-direction motive power or reverse-direction motive power and outputs the resulting motive power from the motor shaft 28b. The continuously variable transmission 28 also continuously varies the number of revolutions of the motive power to be outputted. The continuously variable transmission 28 transmits the motive power through the second gear mechanism 30 to the first sun gear 32a of the first planetary transmission section 32. The engine 4 transmits motive power through the input shaft 20 and the third gear mechanism 29 to the first ring gear 32c of the first planetary transmission section 32. The first and second planetary transmission sections 32 and 33 composite (i) the motive power from the continuously variable transmission 28 and (ii) the motive power from the engine 4. The second planetary transmission section 33 transmits the composite motive power to the output section 31B, which then outputs the composite motive power from its output shaft 35.

The main transmission section 21 is configured such that, in response to the continuously variable transmission 28 being varied with the first clutch CL1 engaged, the composite motive power as composited by the planetary transmission unit 31A is transmitted from the second ring gear 33c to the first input shaft 34a of the output section 31B. The output section 31B then converts the composite motive power into motive power continuously variable within the first-gear range with use of the first range gear mechanism 36a and the first clutch CL1, and outputs the resulting motive power from the output shaft 35.

In response to the continuously variable transmission 28 being varied with the second clutch CL2 engaged, the composite motive power as composited by the planetary transmission unit 31A is transmitted from the second sun gear 33a to the third input shaft 34c of the output section 31B. The output section 31B then converts the composite motive power into motive power continuously variable within the second-gear range with use of the second range gear mechanism 36b and the second clutch CL2, and outputs the resulting motive power from the output shaft 35.

In response to the continuously variable transmission 28 being varied with the third clutch CL3 engaged, the composite motive power as composited by the planetary transmission unit 31A is transmitted from the second carrier 33d to the second input shaft 34b of the output section 31B. The output section 31B then converts the composite motive power into motive power continuously variable within the third-gear range with use of the third range gear mechanism 36c and the third clutch CL3, and outputs the resulting motive power from the output shaft 35.

In response to the continuously variable transmission 28 being varied with the fourth clutch CL4 engaged, the composite motive power as composited by the planetary transmission unit 31A is transmitted from the second sun gear 33a to the third input shaft 34c of the output section 31B. The output section 31B then converts the composite motive power into motive power continuously variable within the fourth-gear range with use of the fourth range gear mechanism 36d and the fourth clutch CL4, and outputs the resulting motive power from the output shaft 35.

As illustrated in FIG. 2, the forward/backward travel switching device 23 includes an input shaft 23a, an output shaft 23b, a forward-travel gear interlocking mechanism 23c, and a backward-travel gear interlocking mechanism 23d. The input shaft 23a is coupled to the output shaft 35 of the planetary transmission 31. The output shaft 23b is parallel to the input shaft 23a. The input shaft 23a is provided with a forward clutch CLF and a reverse clutch CLR. The forward-travel gear interlocking mechanism 23c extends from the forward clutch CLF to the output shaft 23b. The backward-travel gear interlocking mechanism 23d extends from the reverse clutch CLR to the output shaft 23b.

Engaging the forward clutch CLF couples the input shaft 23a to the forward-travel gear interlocking mechanism 23c. This achieves a forward-travel power transmission state, in which motive power from the input shaft 23a is transmitted through the forward-travel gear interlocking mechanism 23c to the output shaft 23b. Engaging the reverse clutch CLR couples the input shaft 23a to the backward-travel gear interlocking mechanism 23d. This achieves a backward-travel power transmission state, in which motive power from the input shaft 23a is transmitted through the backward-travel gear interlocking mechanism 23d to the output shaft 23b.

The forward/backward travel switching device 23 receives the output from the planetary transmission 31 at the input shaft 23a. Engaging the forward clutch CLF causes motive power from the input shaft 23a to be converted by the forward clutch CLF and the forward-travel gear interlocking mechanism 23c into forward-travel motive power to be transmitted to the output shaft 23b. Engaging the reverse clutch CLR causes motive power from the input shaft 23a to be converted by the reverse clutch CLR and the backward-travel gear interlocking mechanism 23d into backward-travel motive power to be transmitted to the output shaft 23b. The output shaft 23b transmits the forward-travel motive power and backward-travel motive power through the gear mechanism 24 to the rear-wheel differential mechanism 16 and the front-wheel power transmission section 25.

The rear-wheel differential mechanism 16 receives the forward-travel motive power or backward-travel motive power from the forward/backward travel switching device 23, and transmits the motive power from a pair of left and right output shafts 16b to the respective rear wheels 2. The left output shaft 16b transmits its motive power through a planetary deceleration mechanism 37 to the left rear wheel 2. The left output shaft 16b is provided with a steering brake 38. The right output shaft 16b transmits motive power to the right rear wheel 2 in a system including a planetary deceleration mechanism 37 and a steering brake 38 (not illustrated in the drawing) similarly to the power transmission system for the left rear wheel 2.

As illustrated in FIG. 2, the front-wheel power transmission section 25 includes an input shaft 25a and an output shaft 25b. The input shaft 25a is coupled to the output shaft 24a of the gear mechanism 24. The output shaft 25b is parallel to the input shaft 25a. The input shaft 25a is provided with a constant-rate clutch CLT and a rate-increasing clutch CLH backward of the constant-rate clutch CLT. The front-wheel power transmission section 25 includes a constant-rate gear mechanism 40 extending from the constant-rate clutch CLT to the output shaft 25b and a rate-increasing gear mechanism 41 extending from the rate-increasing clutch CLH to the output shaft 25b. The output shaft 24a of the gear mechanism 24 is provided with a parking brake 39.

The front-wheel power transmission section 25 is configured such that engaging the constant-rate clutch CLT causes motive power from the input shaft 25a to be transmitted through the constant-rate clutch CLT and the constant-rate gear mechanism 40 to the output shaft 25b. Further, the constant-rate gear mechanism 40 achieves a constant-rate power transmission state, in which the output shaft 25b outputs motive power to drive the front wheels 1 such that the front wheels 1 have a circumferential speed equal to that of the rear wheels 2. Engaging the rate-increasing clutch CLH causes motive power from the input shaft 25a to be transmitted through the rate-increasing clutch CLH and the rate-increasing gear mechanism 41 to the output shaft 25b. Further, the rate-increasing gear mechanism 41 achieves a front-wheel rate-increasing power transmission state, in which the output shaft 25b outputs motive power for driving the front wheels 1 such that the front wheels 1 have a circumferential speed higher than that of the rear wheels 2. The output from the output shaft 25b is received by the front-wheel differential mechanism 17 through a rotary shaft 42 coupling the output shaft 25b to the input shaft 17a of the front-wheel differential mechanism 17.

The body 3 is configured such that engaging the constant-rate clutch CLT leads to a four-wheel drive mode in which the front and rear wheels 1 and 2 are driven such that the front wheels 1 have an average circumferential speed equal to that of the rear wheels 2. Engaging the rate-increasing clutch CLH leads to a four-wheel drive mode in which the front and rear wheels 1 and 2 are driven such that the front wheels 1 have an average circumferential speed higher than that of the rear wheels 2. Engaging the rate-increasing clutch CLH allows the body 3 to turn with a radius smaller than when the constant-rate clutch CLT is engaged.

Figure 4:
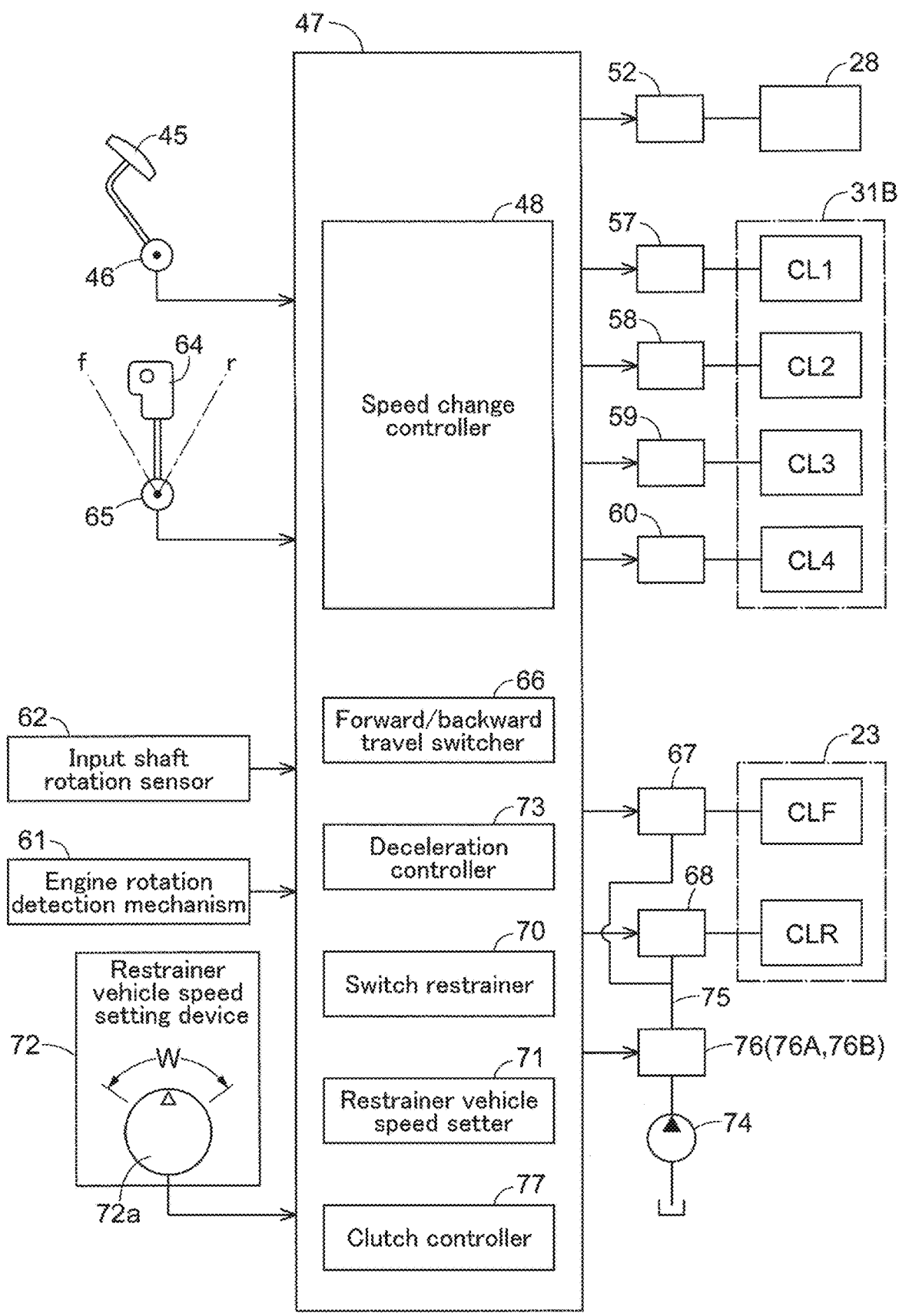
FIG. 4 is a block diagram illustrating a speed change controller.

The driver section 6 includes a shift pedal 45 (see FIG. 4) as a speed change operation tool to vary the continuously variable transmission 28. As illustrated in FIG. 4, the tractor includes a first potentiometer 46 and a controller 47. The first potentiometer 46 is configured to detect the position of the shift pedal 45 as operated, and is linked to the controller 47. The present preferred embodiment, which includes a first potentiometer 46, may alternatively include any of various position detectors such as a mechanism including a detection switch.

As illustrated in FIG. 4, the controller 47 is linked to the continuously variable transmission 28. The controller 47 preferably is in the form of a microcomputer, and includes a speed change controller 48 configured or programmed to detect based on information detected by the first potentiometer 46 that the shift pedal 45 has been operated and vary the continuously variable transmission 28.

Figure 5:
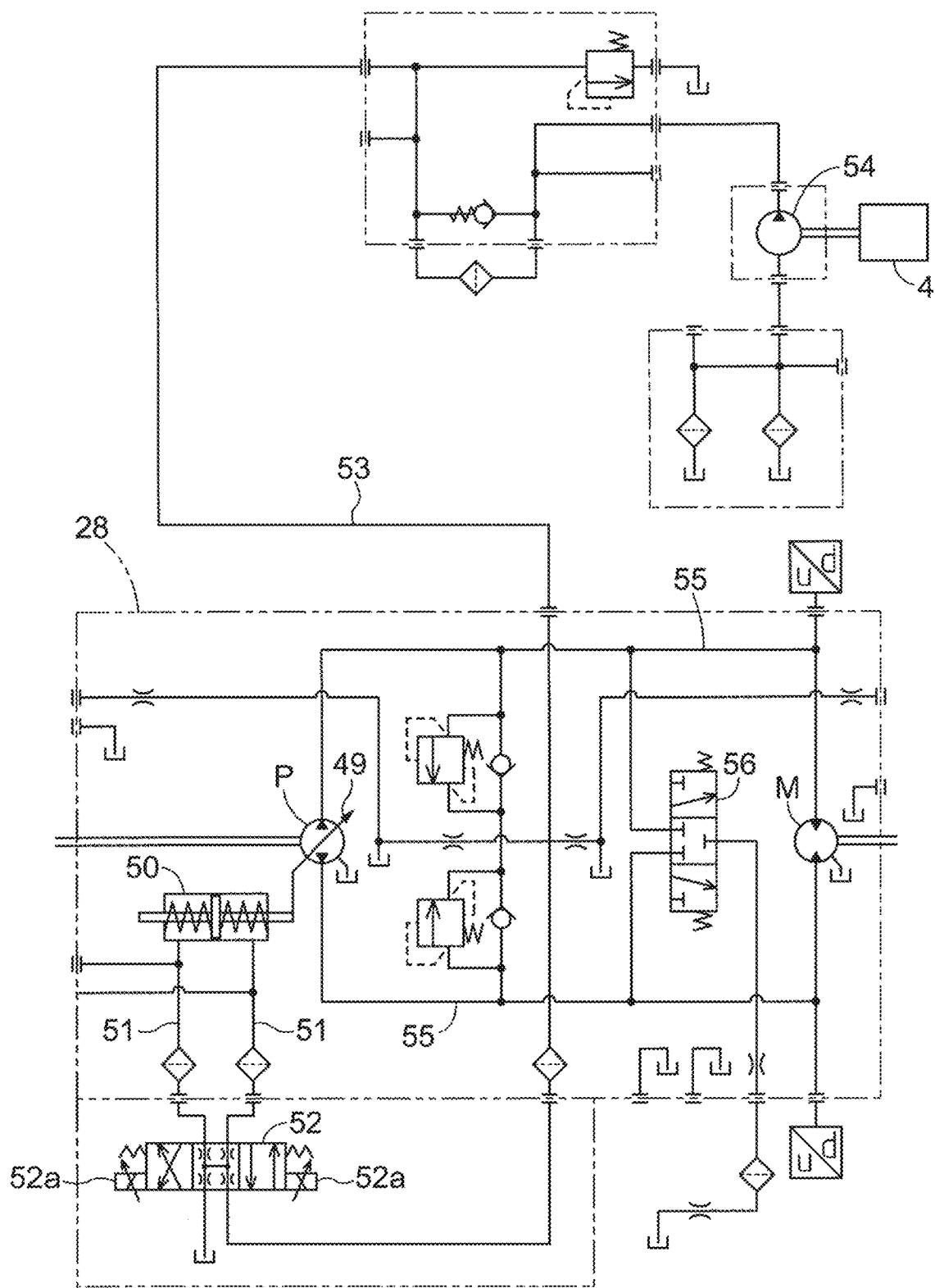
FIG. 5 is a hydraulic circuit diagram illustrating a continuously variable transmission and a structure to operate the continuously variable transmission.

The speed change controller 48 is configured or programmed to vary the continuously variable transmission 28 based on the operation structure illustrated in FIG. 5. Specifically, as illustrated in FIG. 5, the continuously variable transmission 28 includes a hydraulic cylinder 50 coupled to a swash plate 49 of the hydraulic pump P and connected to a speed change operation valve 52 through an operating oil path 51. The speed change operation valve 52 is connected to a hydraulic pump 54 through a supply oil path 53. The speed change operation valve 52 is switchable to (i) supply operating pressure oil from the hydraulic pump 54 to one of the two oil chambers of the hydraulic cylinder 50 to operate the hydraulic cylinder 50 and (ii) stop the pressure oil from being supplied to the hydraulic cylinder 50 to stop the hydraulic cylinder 50. The continuously variable transmission 28 is variable as a result of the swash plate 49, in response to the speed change operation valve 52 being switched, being tilted by the hydraulic cylinder 50 on the normal or reverse rotation side corresponding to the position of the speed change operation valve 52 as operated. The speed change operation valve 52 includes an electromagnetically operated valve and an electromagnetic operation section 52a linked to the controller 47. The hydraulic pump P is connected to the hydraulic motor M through a drive oil path 55 connected to an emergency relief valve 56.

As illustrated in FIG. 4, the controller 47 is linked to the first to fourth clutches CL1 to CL4, and is configured or programmed to allow the speed change controller 48 to switch the first to fourth clutches CL1 to CL4.

Specifically, the first to fourth clutches CL1 to CL4 are each of a hydraulic type, for example. As illustrated in FIG. 4, the controller 47 is linked to first to fourth switching valves 57 to 60 connected respectively to the first to fourth clutches CL1 to CL4, and allows the speed change controller 48 to switch the first to fourth switching valves 57 to 60.

As illustrated in FIG. 4, the tractor includes an engine rotation detection mechanism 61 configured to detect the number of revolutions of the engine 4 and an input shaft rotation sensor 62 configured to detect the number of revolutions of the input shaft 16a of the rear-wheel differential mechanism 16. The engine rotation detection mechanism 61 and input shaft rotation sensor 62 are linked to the controller 47. The input shaft rotation sensor 62 is, as illustrated in FIG. 2, configured to detect the number of revolutions of a power transmission gear 63 provided for the input shaft 16a as the number of revolutions of the input shaft 16a.

The speed change controller 48 is configured or programmed to, based on information detected by the engine rotation detection mechanism 61 and information detected by the input shaft rotation sensor 62, calculate the gear ratio in speed-changing power transmission between the engine 4 and the input shaft 16a (that is, the number of revolutions of the input shaft 16a/the number of revolutions of the engine 4). The vehicle speed controller 48 is also configured or programmed to, based on the calculated gear ratio G and how the continuously variable transmission 28 has been varied, switch the first to fourth clutches CL1 to CL4 to vary the rotation speed V of the input shaft 16a, which corresponds to the vehicle speed.

Figure 6:
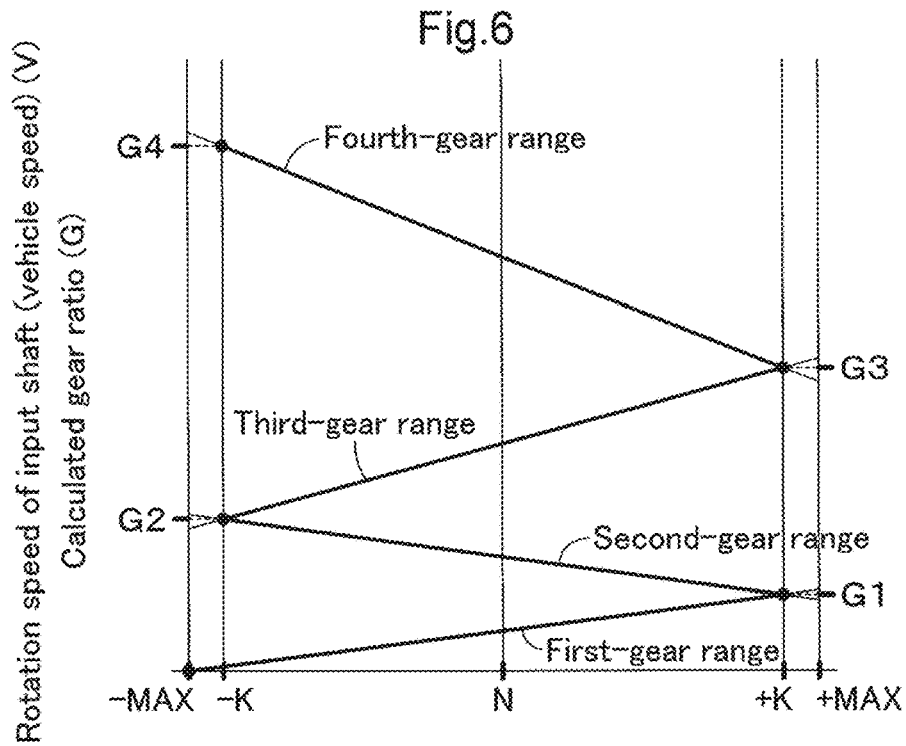
FIG. 6 is a graph that shows how the vehicle speed is changed with use of a speed change controller.

FIG. 6 is a diagram illustrating how the speed change controller 48 changes the vehicle speed. The drawing shows a vertical axis indicative of the calculated gear ratio G and the rotation speed V of the input shaft 16a (which corresponds to the vehicle speed) and a horizontal axis indicative of how the continuously variable transmission 28 has been varied. The symbol "N" indicates the neutral state. The symbol "−MAX" indicates that the continuously variable transmission 28 has been varied to output reverse-direction motive power for the maximum speed. The symbol "+MAX" indicates that the continuously variable transmission 28 has been varied to output normal-direction motive power for the maximum speed. The symbol "−K" indicates that the continuously variable transmission 28 has been varied to a level to switch the clutch on the reverse-rotation side (that is, before reaching −MAX). The symbol "+K" indicates that the continuously variable transmission 28 has been varied to a level to switch the clutch on the normal-rotation side (that is, before reaching +MAX). The symbols "G1", "G2", "G3", and "G4" refer to preset gear ratios.

Specifically, varying the continuously variable transmission 28 from −MAX toward +MAX with the first clutch CL1 engaged increases the rotation speed V in the first-gear range continuously from zero speed. In response to the continuously variable transmission 28 reaching +K and the calculated gear ratio G reaching G1, the speed change controller 48 disengages the first clutch CL1 and engages the second clutch CL2. Varying the continuously variable transmission 28 toward −MAX with the second clutch CL2 engaged increases the rotation speed V in the second-gear range continuously. In response to the continuously variable transmission 28 reaching −K and the calculated gear ratio G reaching G2, the speed change controller 48 disengages the second clutch CL2 and engages the third clutch CL3. Varying the continuously variable transmission 28 toward +MAX with the third clutch CL3 engaged increases the rotation speed V in the third-gear range continuously. In response to the continuously variable transmission 28 reaching +K and the calculated gear ratio G reaching G3, the speed change controller 48 disengages the third clutch CL3 and engages the fourth clutch CL4. Varying the continuously variable transmission 28 toward −MAX with the fourth clutch CL4 engaged increases the rotation speed V in the fourth-gear range continuously.

The driver section 6 includes a forward/backward travel lever 64 (see FIG. 4) as a forward/backward travel switching tool for use in switching the forward/backward travel switching device 23. As illustrated in FIG. 4, the tractor includes a second potentiometer 65 that is configured to detect the position of the forward/backward travel lever 64 as operated and that is linked to the controller 47. The present preferred embodiment, which includes a second potentiometer 65, may alternatively include any of various position detectors such as a detection switch.

As illustrated in FIG. 4, the controller 47 is linked to the forward/backward travel switching device 23. The controller 47 includes a forward/backward travel switcher 66 configured to, in response to the forward/backward travel lever 64 being operated, (i) detect a switch of forward/backward travel based on information detected by the second potentiometer 65 and (ii) switch the forward/backward travel switching device 23 into the forward-travel power transmission state or the backward-travel power transmission state in correspondence with the position of the forward/backward travel lever 64 (that is, a forward-travel position f or a reverse-travel position r). The forward and reverse clutches CLF and CLR are each operable based on oil pressure, and are each configured to receive operating oil to be engaged and discharge operating oil to be disengaged. As illustrated in FIG. 4, the forward and reverse clutches CLF and CLR are connected respectively to a forward-travel operation valve 67 and a backward-travel operation valve 68 both linked to the controller 47 and controllable by the forward/backward travel switcher 66. This allows the forward/backward travel switcher 66 to switch the forward/backward travel switching device 23.

As illustrated in FIG. 4, the controller 47 is configured or programmed to include a switch restrainer 70, a restrainer vehicle speed setter 71, and a deceleration controller 73. The controller 47 is linked to a restrainer vehicle speed setting device 72.

The restrainer vehicle speed setter 71 is configured to set a restrainer vehicle speed SV to prevent switching of the forward/backward travel switching device 23, the restrainer vehicle speed SV being changeable with use of the restrainer vehicle speed setting device 72.

Specifically, the restrainer vehicle speed setting device 72, as illustrated in FIG. 4, includes a dial operation tool 72a rotatable over an adjustment range W. The restrainer vehicle speed setter 71 is capable of continuously changing the restrainer vehicle speed SV over a range corresponding to the adjustment range W. Each time the restrainer vehicle speed setting device 72 is adjusted, the restrainer vehicle speed setter 71 replaces the current restrainer vehicle speed SV with a new restrainer vehicle speed SV corresponding to the position of the operation tool 72a as adjusted, in response to an instruction from the restrainer vehicle speed setting device 72. The restrainer vehicle speed setter 71 sets a higher restrainer vehicle speed SV in response to the operation tool 72a being adjusted further on the high-speed side. The restrainer vehicle speed setting device 72 for the present preferred embodiment includes a dial operation tool 72a, but may be any of various types. For instance, the restrainer vehicle speed setting device 72 may alternatively include a slidable operation tool or a touch screen.

The switch restrainer 70 is configured or programmed to (i) receive information on a detected vehicle speed KV as the number of revolutions of the input shaft 16a detected by the input shaft rotation sensor 62 as a vehicle speed detector and (ii) prevent switching of the forward/backward travel switching device 23 based on the detected vehicle speed KV and the restrainer vehicle speed SV set by the restrainer vehicle speed setter 71.

Figure 7:
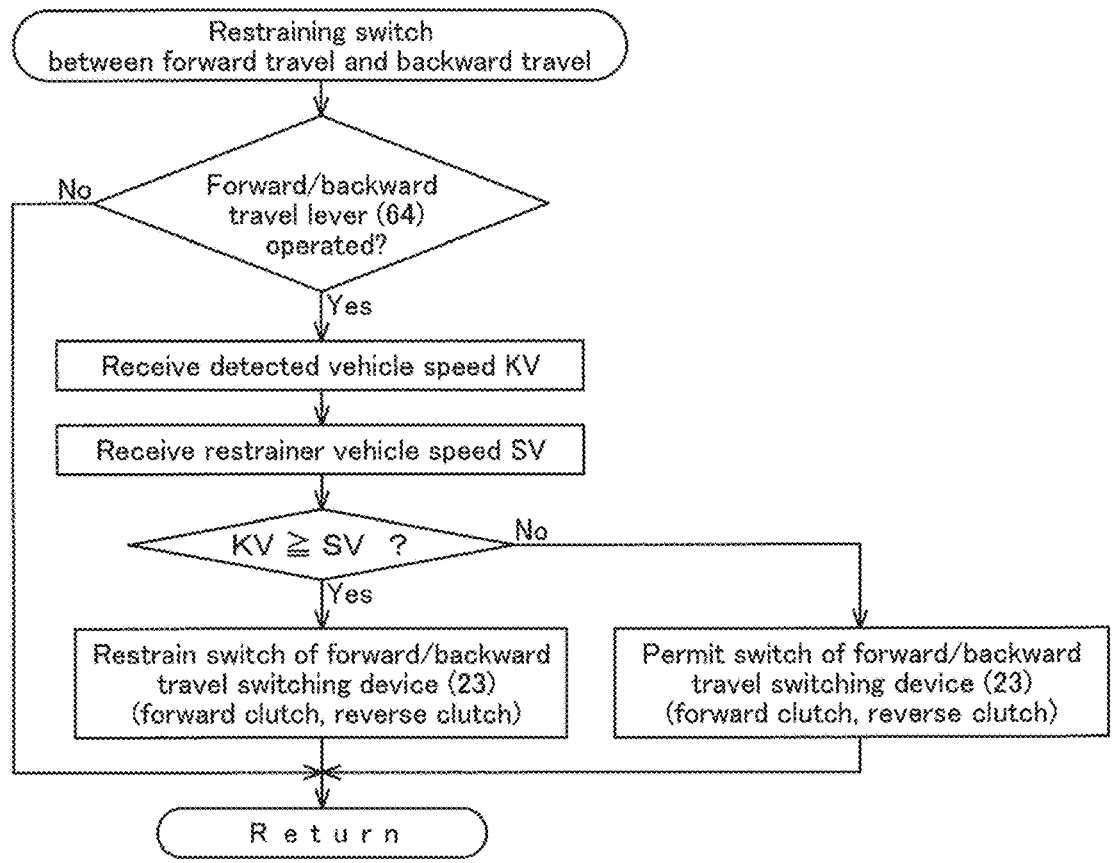
FIG. 7 is a flowchart of how to prevent switching between forward travel and backward travel.

Specifically, as illustrated in FIG. 7, the switch restrainer 70, in response to detecting based on information detected by the second potentiometer 65 that the forward/backward travel lever 64 has been switched between the forward-travel position f and the reverse-travel position r, (i) receives information on a detected vehicle speed KV as the number of revolutions of the input shaft 16a detected by the input shaft rotation sensor 62 and information on the restrainer vehicle speed SV set by the restrainer vehicle speed setter 71 and (ii) compares the detected vehicle speed KV with the restrainer vehicle speed SV. If the switch restrainer 70 has determined that the detected vehicle speed KV is a high speed not lower than the restrainer vehicle speed SV, the switch restrainer 70 prevents the forward/backward travel switcher 66 from switching the forward/backward travel switching device 23, that is, switching of the forward and reverse clutches CLF and CLR. If the switch restrainer 70 has determined that the detected vehicle speed KV is lower than the restrainer vehicle speed SV, the switch restrainer 70 permits the forward/backward travel switcher 66 to switch the forward/backward travel switching device 23, that is, switching of the forward and reverse clutches CLF and CLR.

Figure 8:
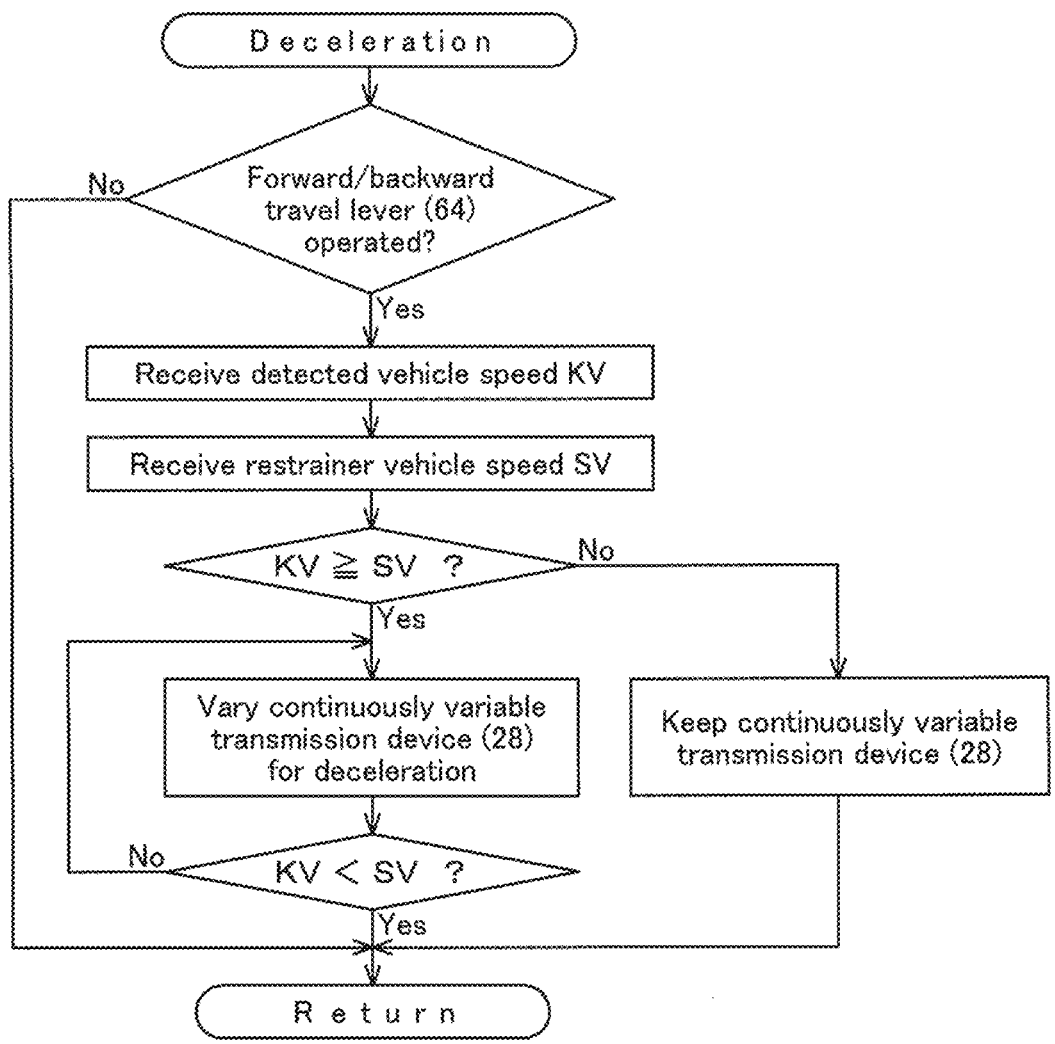
FIG. 8 is a flowchart of how to decelerate.

As illustrated in FIG. 8, the deceleration controller 73, in response to detecting based on information detected by the second potentiometer 65 that the forward/backward travel lever 64 has been switched between the forward-travel position f and the reverse-travel position r, (i) receives information on a detected vehicle speed KV as the number of revolutions of the input shaft 16a detected by the input shaft rotation sensor 62 and information on the restrainer vehicle speed SV set by the restrainer vehicle speed setter 71 and (ii) compares the detected vehicle speed KV with the restrainer vehicle speed SV. If the deceleration controller 73 has determined that the detected vehicle speed KV is a high speed not lower than the restrainer vehicle speed SV, the deceleration controller 73 takes priority over the speed change controller 48 to vary the continuously variable transmission 28 for deceleration and stops varying the continuously variable transmission 28 in response to the detected vehicle speed KV becoming lower than the restrainer vehicle speed SV. If the deceleration controller 73 has determined that the detected vehicle speed KV is lower than the restrainer vehicle speed SV, the deceleration controller 73 avoids varying the continuously variable transmission 28 for deceleration and keeps the continuously variable transmission 28 as when the deceleration controller 73 detected that the forward/backward travel lever 64 has been switched.

As illustrated in FIG. 4, the forward and reverse clutches CLF and CLR are linked to a clutch adjustment mechanism unit 76 including a speed adjustment mechanism 76A configured to adjust the speed at which the forward and reverse clutches CLF and CLR are each switched and a clutch pressure adjustment mechanism 76B configured to adjust the pressure at which the forward and reverse clutches CLF and CLR are each engaged.

FIG. 9 provides a graph that shows how the clutches are switched in response to the forward/backward travel switching device 23 being switched from a forward-travel state to a backward-travel state for the tractor (with no implement coupled thereto) and a graph that shows the results of measuring the change in the vehicle speed. The two graphs each show a horizontal axis indicative of time. The upper graph shows a vertical axis on the right that indicates a system pressure applied by an actuator to the forward and reverse clutches CLF and CLR, line f indicative of a forward-travel instruction, line r indicative of a reverse-travel instruction, line fp indicative of a change in the system pressure applied to the forward clutch CLF, and line rp indicative of a change in the system pressure applied to the reverse clutch CLR. The lower graph shows a vertical axis on the left that indicates the number of revolutions of the forward/backward travel switching device 23 on the axle side and line L indicative of a change in the number of revolutions of the forward/backward travel switching device 23 on the axle side.

In response to a switch from the forward-travel instruction f to the reverse-travel instruction r, the actuator to drive the reverse clutch CLR increases and decreases the system pressure with use of a proportional pressure-reducing valve to engage and disengage the reverse clutch CLR, and also adjusts the system pressure to an intermediate pressure to slip the reverse clutch CLR. (Pressure depends on the total weight of the tractor and an implement coupled thereto and the load.) Thus, until a predetermined time period tw elapses from time point t of the switch from the forward-travel instruction to the reverse-travel instruction, the actuator applies the maximum pressure SP1 to the gap in the reverse clutch CLR to inject oil into the reverse clutch CLR so that the gap is almost full. Until the gap is almost full, transmission of torque is still hardly allowed. The actuator adjusts the system pressure between forward travel and neutral or backward travel and neutral. The gap in the clutch varies in size depending on the length of time of the switch. The predetermined time period tw is adjusted in accordance with the gap size. After the predetermined time period tw has elapsed, the actuator gradually increases the pressure as shown with the inclined portion rpk of line rp to cause the reverse clutch CLR to transmit torque and change the traveling direction. During this time period, the number of revolutions of the forward/backward travel switching device 23 on the axle side (that is, the vehicle speed) gradually changes as shown with line L in the lower graph from the number Vf of revolutions on the forward-travel side past zero to the number of revolutions on the backward-travel side. The reverse clutch CLR becomes fully engaged at time point t1, completing the switch to backward travel. The number of revolutions of the forward/backward travel switching device 23 on the axle side (that is, the vehicle speed) then reaches the number Vr of revolutions on the backward-travel side. A similar operation is performed when the forward/backward travel switching device 23 is switched from the backward travel state to the forward-travel state in response to switching from the reverse-travel instruction to the forward-travel instruction.

With the above configuration, the speed adjustment mechanism 76A, in response to switching between a forward-travel instruction and a reverse-travel instruction, injects oil into the gap in that one of the forward and reverse clutches CLF and CLR which is to be engaged. The speed adjustment mechanism 76A supplies oil into the forward clutch CLF or reverse clutch CLR so that the gap is almost full by the time the predetermined time period tw elapses from time point t of the switch of the instruction to allow quick transmission of torque at the time of switching between the forward and reverse clutches CLF and CLR. The speed adjustment mechanism 76A injects oil as above regardless of the speed at which the tractor is traveling at the time of switching the clutches or the clutch switch sensitivity, which determines the strength required for switching of the clutches. The gap preferably becomes full of oil rapidly so that torque is able to be transmitted to the forward and reverse clutches CLF and CLR.

The clutch pressure adjustment mechanism 76B adjusts the pressure of the proportional pressure-reducing valve to adjust the clutch switch sensitivity to the sensitive side or insensitive side based on a change in the vehicle speed in correspondence with the travel speed, the clutch switch sensitivity, and the total weight of the tractor and an implement coupled thereto and the load. The clutch pressure adjustment mechanism 76B speeds up the increase in the pressure of the proportional pressure-reducing valve within a predetermined time period th to increase the clutch switch sensitivity (that is, to decrease a predetermined time period th, which extends from time point t2 after the predetermined time period tw has elapsed to time point t1, at which the forward clutch CLF or reverse clutch CLR becomes fully coupled), and slows down the increase in the pressure of the proportional pressure-reducing valve within the predetermined time period th to decrease the clutch switch sensitivity (that is, to increase the predetermined time period th).

More specifically, the forward and reverse clutches CLF and CLR each include a clutch chamber (not illustrated in the drawings) configured to receive operating oil and clutch plates (not illustrated in the drawings) configured to be pressed by operating oil supplied into the clutch chamber to be connected to each other. Connecting or fully coupling the clutch plates engages the forward and reverse clutches CLF and CLR, whereas disconnecting the clutch plates disengages the forward and reverse clutches CLF and CLR.

Adjusting the pressure of operating oil to be supplied can adjust how slippery the clutch is to change how the clutch plates are connected. Specifically, increasing the pressure of operating oil while the clutch is disengaged causes oil to flow into the clutch chamber to fill the gap between the clutch plates. The oil stops flowing in when the gap is filled. Then, whether the clutch slips depends on the pressure. The clutch plates become connected under a low pressure when the clutch is receiving almost no load, whereas the clutch plates do not become connected unless the pressure is increased when the clutch is receiving a large load. This means that first, the amount of operating oil determines the length of time required to fill the gap and that after the gap has been filled, the pressure changes how the clutch plates are connected.

The clutch adjustment mechanism unit 76 is provided for an operating oil path 75 to supply operating pressure oil from a hydraulic pump 74 to the forward-travel operation valve 67 of the forward clutch CLF and to the backward-travel operation valve 68 of the reverse clutch CLR.

The speed adjustment mechanism 76A, in response to a switch between the forward-travel instruction and the reverse-travel instruction, supplies oil into that one of the forward and reverse clutches CLF and CLR which is to be engaged so that the gap becomes almost full as rapidly as possible. The speed adjustment mechanism 76A then gradually increases the pressure of the oil with use of the proportional pressure-reducing valve so that the forward clutch CLF or reverse clutch CLR becomes engaged (that is, fully coupled). The speed adjustment mechanism 76A, in response to being adjusted to the low-speed side, slows the time period for gradually increasing the pressure of the oil with use of the proportional pressure-reducing valve to delay the engagement of the forward clutch CLF or reverse clutch CLR.

The speed adjustment mechanism 76A, in response to being adjusted to the high-speed side, supplies oil into that one of the forward and reverse clutches CLF and CLR which is to be engaged so that the gap becomes almost full as rapidly as possible. The speed adjustment mechanism 76A then speeds up the increase in the pressure of the oil with use of the proportional pressure-reducing valve so that the forward clutch CLF or reverse clutch CLR becomes engaged (that is, fully coupled) quickly.

The clutch pressure adjustment mechanism 76B, in response to being adjusted on the high-pressure side, adjusts the pressure of operating oil to be supplied to the high-pressure side to connect the clutch plates so that the clutch does not slip even under a heavy drive load and that the forward and reverse clutches CLF and CLR become engaged in such a manner as to transmit motive power even under a heavy drive load.

The clutch pressure adjustment mechanism 76B, in response to being adjusted to the low-pressure side, adjusts the pressure of operating oil to be supplied to the low-pressure side to connect the clutch plates so that the clutch does not slip even under a light drive load and that the forward and reverse clutches CLF and CLR become engaged so as to transmit motive power even under a light drive load.

The controller 47 includes a clutch controller 77 configured or programmed to determine based on information from the restrainer vehicle speed setter 71 whether the restrainer vehicle speed SV is on the low-speed side or on the high-speed side. If the clutch controller 77 has determined that the restrainer vehicle speed SV is on the low-speed side, the clutch controller 77 adjusts the speed adjustment mechanism 76A to the high-speed side and the clutch pressure adjustment mechanism 76B to the low-pressure. If the clutch controller 77 has determined that the restrainer vehicle speed SV is on the high-speed side, the clutch controller 77 adjusts the speed adjustment mechanism 76A to the low-speed side and the clutch pressure adjustment mechanism 76B to the high-pressure. The clutch controller 77 operates the speed adjustment mechanism 76A and the clutch pressure adjustment mechanism 76B when the forward/backward travel switcher 66 switches the forward and reverse clutches CLF and CLR.

The present preferred embodiment is configured such that the clutch controller 77 is configured or programmed to operate the speed adjustment mechanism 76A and the clutch pressure adjustment mechanism 76B. The clutch controller 77 may alternatively be omitted, so that a human operator operates the speed adjustment mechanism 76A and the clutch pressure adjustment mechanism 76B.

The power transmission 15 is configured such that the planetary transmission unit 31A of the planetary transmission 31 receives and composites motive power from the engine 4 and motive power from the continuously variable transmission 28, and outputs the composite motive power from the output section 31B of the planetary transmission 31. The forward/backward travel switching device 23 receives the composite motive power, converts the composite motive power into forward-travel motive power or backward-travel motive power, and transmits the motive power to the rear-wheel differential mechanism 16 as well as to the front-wheel differential mechanism 17 through the front-wheel power transmission section 25. The rear-wheel differential mechanism 16 transmits the motive power to the left and right rear wheels 2. The front-wheel differential mechanism 17 transmits the motive power to the left and right front wheels 1. This allows the front and rear wheels 1 and 2 to be driven for the body 3 to travel forward or backward.

In response to the shift pedal 45 being operated, the speed change controller 48 varies the continuously variable transmission 28 based on information detected by the first potentiometer 46, and the speed change controller 48 switches the first to fourth clutches CL1 to CL4 based on how the continuously variable transmission 28 has been varied, information detected by the input shaft rotation sensor 62, and information detected by the engine rotation detection mechanism 61, so that the output section 31B transmits the composite motive power to the forward/backward travel switching device 23 while the composite motive power is variable continuously from the first-gear to fourth-gear ranges. With the forward/backward travel lever 64 in the forward-travel position f, the forward/backward travel switcher 66 engages the forward clutch CLF based on information detected by the second potentiometer 65 to switch the forward/backward travel switching device 23 into the forward-travel power transmission state. The forward/backward travel switching device 23 converts the composite motive power from the planetary transmission 31 into forward-travel motive power and transmits the forward-travel motive power to the rear-wheel differential mechanism 16 and the front-wheel differential mechanism 17. This allows the front and rear wheels 1 and 2 to be driven on the forward-travel side for the body to travel forward while changing its speed. With the forward/backward travel lever 64 in the reverse-travel position r, the forward/backward travel switcher 66 engages the reverse clutch CLR based on information detected by the second potentiometer 65 to switch the forward/backward travel switching device 23 into the backward-travel power transmission state. The forward/backward travel switching device 23 converts the composite motive power from the planetary transmission 31 into backward-travel motive power and transmits the backward-travel motive power to the rear-wheel differential mechanism 16 and the front-wheel differential mechanism 17. This allows the front and rear wheels 1 and 2 to be driven on the backward-travel side for the body to travel backward while changing its speed.

For instance, an operator adjusts the restrainer vehicle speed setting device 72 to the low-speed side when the operator does not switch between forward travel and backward travel frequently. The restrainer vehicle speed setter 71, in response, sets a restrainer vehicle speed SV on the low-speed side corresponding to the position of the restrainer vehicle speed setting device 72 as adjusted. Even if the operator switches the forward/backward travel lever 64 between the forward-travel position f and the reverse-travel position r, the switch restrainer 70 prevents the forward/backward travel switcher 66 from switching the forward and reverse clutches CLF and CLR and prevents the forward/backward travel switching device 23 from being switched if the detected vehicle speed KV is a high speed not lower than the restrainer vehicle speed SV, so that the deceleration controller 73 operates the continuously variable transmission 28 for deceleration. In response to the detected vehicle speed KV becoming lower than the restrainer vehicle speed SV as a result of the deceleration, the switch restrainer 70 permits the forward/backward travel switcher 66 to switch the forward and reverse clutches CLF and CLR, so that the forward/backward travel switcher 66 switches the forward and reverse clutches CLF and CLR and that the forward/backward travel switcher 66 switches the forward/backward travel switching device 23 into the forward-travel power transmission state or backward-travel power transmission state corresponding to the forward-travel position f or reverse-travel position r of the forward/backward travel lever 64 as operated. The switch restrainer 70 permits the forward/backward travel switcher 66 to switch the forward/backward travel switching device 23 while the vehicle speed is low. This allows the tractor to switch between forward travel and backward travel with a reduced shock.

As described above, setting the restrainer vehicle speed SV on the low-speed side allows the forward/backward travel switching device 23 to be switched with a reduced shock. The clutch controller 77 thus adjusts the speed adjustment mechanism 76A to the high-speed side. This allows the forward clutch CLF or reverse clutch CLR to be engaged (that is, fully coupled) quickly. Further, the forward and reverse clutches CLF and CLR are, in this case, switched while the vehicle speed is low. The clutch controller 77 thus adjusts the clutch pressure adjustment mechanism 76B to the low-pressure side. The forward clutch CLF or reverse clutch CLR becomes engaged as a result of the clutch plates becoming connected under a low pressure. This allows the body to change its direction quickly. The speed adjustment mechanism 76A injects oil into the gap of that one of the forward and reverse clutches CLF and CLR which is to be engaged in a constantly identical manner so that the gap becomes almost full as rapidly as possible. The speed adjustment mechanism 76A then speeds up the increase in the pressure of oil of the actuator to drive the one of the forward and reverse clutches CLF and CLR which is to be engaged. This allows the forward and reverse clutches CLF and CLR to be engaged quickly.

For instance, an operator adjusts the restrainer vehicle speed setting device 72 to the high-speed side when the operator switches forward travel and backward travel frequently for dozer work. The restrainer vehicle speed setter 71, in response, sets a restrainer vehicle speed SV on the high-speed side corresponding to the position of the restrainer vehicle speed setting device 72 as adjusted. Even if the operator switches the forward/backward travel lever 64 between the forward-travel position f and the reverse-travel position r, the switch restrainer 70 prevents the forward/backward travel switcher 66 from switching the forward and reverse clutches CLF and CLR and prevents the forward/backward travel switching device 23 from being switched if the detected vehicle speed KV is a high speed not lower than the restrainer vehicle speed SV, so that the deceleration controller 73 operates the continuously variable transmission 28 for deceleration. In response to the detected vehicle speed KV becoming lower than the restrainer vehicle speed SV, the switch restrainer 70 permits the forward/backward travel switcher 66 to switch the forward and reverse clutches CLF and CLR, so that the forward/backward travel switcher 66 switches the forward and reverse clutches CLF and CLR and that the forward/backward travel switcher 66 switches the forward/backward travel switching device 23 into the forward-travel power transmission state or backward-travel power transmission state corresponding to the forward-travel position f or reverse-travel position r of the forward/backward travel lever 64 as operated. In this case, while the deceleration controller 73 has caused the tractor to decelerate by an amount smaller than the amount by which the restrainer vehicle speed setting device 72 would have been adjusted to the low-speed side, the switch restrainer 70 permits the forward/backward travel switcher 66 to switch the forward and reverse clutches CLF and CLR, so that the forward/backward travel switcher 66 switches the forward and reverse clutches CLF and CLR and that the forward/backward travel switcher 66 switches the forward/backward travel switching device 23 into the forward-travel power transmission state or backward-travel power transmission state corresponding to the forward-travel position f or reverse-travel position r of the forward/backward travel lever 64 as operated. The above configuration, in other words, allows the forward/backward travel switching device 23 to be switched while the vehicle speed is high, as compared to the case of setting the restrainer vehicle speed SV on the low-speed side.

As described above, setting the restrainer vehicle speed SV on the high-speed side allows the forward/backward travel switching device 23 to be switched while the vehicle speed is high, as compared to the case of setting the restrainer vehicle speed SV on the low-speed side. The clutch controller 77 thus adjusts the speed adjustment mechanism 76A to the low-speed side. This allows the forward clutch CLF or reverse clutch CLR to be engaged (that is, fully coupled) slowly, and allows the forward/backward travel switching device 23 to be switched with a reduced shock. Further, the forward and reverse clutches CLF and CLR are, in this case, switched while the vehicle speed is high. The clutch controller 77 thus adjusts the clutch pressure adjustment mechanism 76B to the high-pressure side. The forward clutch CLF or reverse clutch CLR becomes engaged as a result of the clutch plates becoming connected under a high pressure. This allows the body to change its direction even while the vehicle speed is high. The speed adjustment mechanism 76A injects oil into the gap of that one of the forward and reverse clutches CLF and CLR which is to be engaged in a constantly identical manner so that the gap becomes almost full as rapidly as possible. The speed adjustment mechanism 76A then slows down the increase in the pressure of oil of the actuator for driving that one of the forward and reverse clutches CLF and CLR which is to be engaged. This allows the forward and reverse clutches CLF and CLR to be engaged slowly.

Alternative Preferred Embodiments

The preferred embodiment described above is an example including a deceleration controller 73. Another preferred embodiment of the present invention may alternatively not include a deceleration controller 73. Specifically, if operating the forward/backward travel lever 64 does not cause the forward/backward travel switcher 66 to switch the forward/backward travel switching device 23, the driver may operate the shift pedal 45 to the deceleration side so that the detected vehicle speed KV is lower than the restrainer vehicle speed SV to switch the forward/backward travel switching device 23.

The preferred embodiment described above is an example in which the planetary transmission 31 outputs composite motive power in one of four speed ranges, for example. The planetary transmission 31 may alternatively output composite motive power in one of three or less or five or more speed ranges.

The preferred embodiment described above is configured such that the restrainer vehicle speed setter 71 changes the restrainer vehicle speed SV continuously to set the restrainer vehicle speed SV. The restrainer vehicle speed setter 71 may alternatively change the restrainer vehicle speed SV stepwise to set the restrainer vehicle speed SV.

The preferred embodiment described above is an example in which the restrainer vehicle speed setting device 72 includes a dial operation tool 72a. The restrainer vehicle speed setting device 72 may alternatively include, for example, a slidable operation tool or a touch screen.

The preferred embodiment described above is an example including a speed adjustment mechanism 76A and a clutch pressure adjustment mechanism 76B. An additional preferred embodiment of the present invention may alternatively include only one or neither of the speed adjustment mechanism 76A and the clutch pressure adjustment mechanism 76B.

The preferred embodiment described above is an example including a clutch controller 77 configured or programmed to operate the speed adjustment mechanism 76A and the clutch pressure adjustment mechanism 76B. Another preferred embodiment of the prevent invention may alternatively omit the clutch controller 77, so that a human operator operates the speed adjustment mechanism 76A and the clutch pressure adjustment mechanism 76B.

The preferred embodiment described above is an example including front and rear wheels 1 and 2. The work vehicle may alternatively include as its movable body a crawler movable body or a combination of a mini crawler and wheels.

The preferred embodiment described above is an example including a shift pedal 45. The present invention is, however, not limited to such a configuration. The work vehicle may alternatively include a shift lever as its speed change operation tool.

The preferred embodiment described above is an example including a forward/backward travel lever 64. The present invention is, however, not limited to such a configuration. The work vehicle may alternatively include a forward/backward travel pedal as its forward/backward travel switching tool.

Preferred embodiments of the present invention are applicable to work vehicles each including (i) a hydrostatic, continuously variable transmission configured to vary motive power from the engine and output the varied motive power, (ii) a planetary transmission configured to receive motive power from the engine and motive power from the continuously variable transmission, composite the motive power from the engine and the motive power from the continuously variable transmission, and output the composite motive power as well as to vary the composite motive power in response to the continuously variable transmission being varied, and (iii) a forward/backward travel switching device configured to output the composite motive power from the planetary transmission toward a movable body.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A work vehicle, comprising:
an engine;
a movable body;
a hydrostatic, continuously variable transmission to receive motive power from the engine, vary the motive power, and output the varied motive power;
a planetary transmission to receive the motive power from the engine and the motive power from the continuously variable transmission, composite the motive power from the engine and the motive power from the continuously variable transmission, and vary and output the composite motive power in response to the continuously variable transmission being varied;
a forward and backward travel switching device switchable between a forward-travel power transmission state and a backward-travel power transmission state, such that, in the forward-travel power transmission state, the forward and backward travel switching device switches the composite motive power from the planetary transmission into forward-travel motive power and outputs the forward-travel motive power to move the movable body, and in the backward-travel power transmission state, the forward and backward travel switching device switches the composite motive power from the planetary transmission into backward-travel motive power and outputs the backward-travel motive power to move the movable body;
a speed change operation tool usable to vary the continuously variable transmission;
a forward and backward travel switching tool for use to switch the forward and backward travel switching device;
a vehicle speed detector to detect a vehicle speed of the work vehicle; and
a controller configured or programmed to define or function as:
a restrainer vehicle speed setter to set a restrainer vehicle speed to prevent switching of the forward and backward travel switching device; and
a switch restrainer to (i) permit switching of the forward and backward travel switching device while the vehicle speed detected by the vehicle speed detector is lower than the restrainer vehicle speed and (ii) prevent switching of the forward and backward travel switching device while the vehicle speed detected by the vehicle speed detector is not lower than the restrainer vehicle speed; wherein
the restrainer vehicle speed setter is configured or programmed to change the restrainer vehicle speed.
2. The work vehicle according to claim 1, wherein the controller is configured or programmed to define or function as a deceleration controller to, in response to the forward and backward travel switching tool being operated, vary the continuously variable transmission for deceleration if the vehicle speed detected by the vehicle speed detector is not lower than the restrainer vehicle speed so that the vehicle speed detected by the vehicle speed detector is lower than the restrainer vehicle speed.

3. The work vehicle according to claim 2, wherein the forward and backward travel switching device includes:
   a forward clutch engageable to switch the forward and backward travel switching device into the forward-travel power transmission state; and
   a reverse clutch engageable to switch the forward and backward travel switching device into the backward-travel power transmission state; and
   the work vehicle further comprises:
   a speed adjustment mechanism to adjust a speed with which the forward clutch and the reverse clutch are each switched.

4. The work vehicle according to claim 2, wherein the forward and backward travel switching device includes:
   a forward clutch engageable to switch the forward and backward travel switching device into the forward-travel power transmission state; and
   a reverse clutch engageable to switch the forward and backward travel switching device into the backward-travel power transmission state; and
   the work vehicle further comprises:
   a clutch pressure adjustment mechanism to adjust a pressure at which the forward clutch and the reverse clutch are each engaged.

5. The work vehicle according to claim 2, wherein the restrainer vehicle speed setter is configured or programmed to change the restrainer vehicle speed continuously over a predetermined range.

6. The work vehicle according to claim 5, wherein the forward and backward travel switching device includes:
   a forward clutch engageable to switch the forward and backward travel switching device into the forward-travel power transmission state; and
   a reverse clutch engageable to switch the forward and backward travel switching device into the backward-travel power transmission state; and
   the work vehicle further comprises:
   a speed adjustment mechanism to adjust a speed with which the forward clutch and the reverse clutch are each switched;
   a clutch pressure adjustment mechanism to adjust a pressure at which the forward clutch and the reverse clutch are each engaged; and
   a clutch controller configured or programmed to determine based on an input from the restrainer vehicle speed setter whether the restrainer vehicle speed is on a low-speed side or a high-speed side; and
   the clutch controller is configured or programmed to:
   in response to determining that the restrainer vehicle speed is on the low-speed side, adjust the speed adjustment mechanism to a high-speed side and the clutch pressure adjustment mechanism to a low-pressure side; and
   in response to determining that the restrainer vehicle speed is on the high-speed side, adjust the speed adjustment mechanism to a low-speed side and the clutch pressure adjustment mechanism to a high-pressure side.

7. The work vehicle according to claim 1, wherein the forward and backward travel switching device includes:
   a forward clutch engageable to switch the forward and backward travel switching device into the forward-travel power transmission state; and
   a reverse clutch engageable to switch the forward and backward travel switching device into the backward-travel power transmission state; and
   the work vehicle further comprises a speed adjustment mechanism to adjust a speed with which the forward clutch and the reverse clutch are each switched.

8. The work vehicle according to claim 1, wherein the forward and backward travel switching device includes:
   a forward clutch engageable to switch the forward and backward travel switching device into the forward-travel power transmission state; and
   a reverse clutch engageable to switch the forward and backward travel switching device into the backward-travel power transmission state; and
   the work vehicle further comprises a clutch pressure adjustment mechanism to adjust a pressure at which the forward clutch and the reverse clutch are each engaged.

9. The work vehicle according to claim 1, wherein the restrainer vehicle speed setter is configured or programmed to change the restrainer vehicle speed continuously over a predetermined range.

10. The work vehicle according to claim 9, wherein the forward and backward travel switching device includes:
    a forward clutch engageable to switch the forward and backward travel switching device into the forward-travel power transmission state; and
    a reverse clutch engageable to switch the forward and backward travel switching device into the backward-travel power transmission state; and
    the work vehicle further comprises:
    a speed adjustment mechanism to adjust a speed with which the forward clutch and the reverse clutch are each switched;
    a clutch pressure adjustment mechanism to adjust a pressure at which the forward clutch and the reverse clutch are each engaged; and
    a clutch controller configured or programmed to determine based on an input from the restrainer vehicle speed setter whether the restrainer vehicle speed is on a low-speed side or a high-speed side; and
    the clutch controller is configured or programmed to:
    in response to determining that the restrainer vehicle speed is on the low-speed side, adjust the speed adjustment mechanism to a high-speed side and the clutch pressure adjustment mechanism to a low-pressure side; and
    in response to determining that the restrainer vehicle speed is on the high-speed side, adjust the speed adjustment mechanism to a low-speed side and the clutch pressure adjustment mechanism to a high-pressure side.

* * * * *